US012538409B2

(12) United States Patent
Tanaka et al.

(10) Patent No.: US 12,538,409 B2
(45) Date of Patent: Jan. 27, 2026

(54) PLASMA GENERATING DEVICE, PLASMA PROCESSING DEVICE, AND PLASMA ETCHING DEVICE FOR SEAMLESS ROLLER MOLD

(71) Applicants: ASAHI KASEI KABUSHIKI KAISHA, Tokyo (JP); SHINKO-SEIKI CO., LTD., Kobe (JP)

(72) Inventors: Tsuneharu Tanaka, Tokyo (JP); Kohei Murakami, Kobe (JP); Akira Nagayasu, Kobe (JP)

(73) Assignees: ASAHI KASEI KABUSHIKI KAISHA, Tokyo (JP); SHINKO-SEIKI CO., LTD., Kobe (JP)

( * ) Notice: Subject to any disclaimer, the term of this patent is extended or adjusted under 35 U.S.C. 154(b) by 103 days.

(21) Appl. No.: 18/561,193

(22) PCT Filed: May 27, 2022

(86) PCT No.: PCT/JP2022/021765
§ 371 (c)(1),
(2) Date: Nov. 15, 2023

(87) PCT Pub. No.: WO2022/250145
PCT Pub. Date: Dec. 1, 2022

(65) Prior Publication Data
US 2024/0260165 A1 Aug. 1, 2024

(30) Foreign Application Priority Data
May 27, 2021 (JP) ................................. 2021-089141

(51) Int. Cl.
*H05H 1/46* (2006.01)

(52) U.S. Cl.
CPC .......... *H05H 1/4652* (2021.05); *H05H 1/466* (2021.05)

(58) Field of Classification Search
CPC ..... H05H 1/4652; H05H 1/466; H01J 37/321; H01J 37/3211; H01J 37/32174; H01J 37/32403
See application file for complete search history.

(56) References Cited

U.S. PATENT DOCUMENTS 3,705,091 A 12/1972 Jacob
2011/0027408 A1 2/2011 Suzuki et al.
(Continued)

FOREIGN PATENT DOCUMENTS

CN 104359082 A 2/2015
CN 113889391 A * 1/2022 ............ H01J 37/321
(Continued)

OTHER PUBLICATIONS

European Search Report for European Application No. 22811413.8, dated Sep. 30, 2024.
(Continued)

*Primary Examiner* — Henry Luong
(74) *Attorney, Agent, or Firm* — Birch, Stewart, Kolasch & Birch, LLP

(57) ABSTRACT

In order to enable generation of plasma with higher density in a container with larger capacity, a plasma generating device according to this disclosure is includes a high-frequency circuit (20) having an inductive load and a high-frequency power supply (22) which supplies high-frequency power to the inductive load and a reaction container which is configured capable of pressure reduction and in which plasma is generated by applying the high-frequency power to the inductive load. The inductive load is constituted by a spiral antenna coil (21) disposed so as to
(Continued)

surround a periphery of the reaction container, and the antenna coil is divided into at least two or more parts. The high-frequency circuit (20) has a plurality of paths (23) on which each of the antenna coils (21) divided into at least two or more parts is provided.

4 Claims, 13 Drawing Sheets

(56) References Cited

U.S. PATENT DOCUMENTS

| | | | | |
|---|---|---|---|---|
| 2011/0133650 | A1 | 6/2011 | Kim | |
| 2014/0190635 | A1 | 7/2014 | Lee et al. | |
| 2014/0320017 | A1* | 10/2014 | Chae | H01J 37/32183 315/111.51 |

FOREIGN PATENT DOCUMENTS

| | | | | | |
|---|---|---|---|---|---|
| JP | 48-44176 | A | | 6/1973 | |
| JP | 2000-12296 | A | | 1/2000 | |
| JP | 2000012296 | A | * | 1/2000 | |
| JP | 2000323298 | A | * | 11/2000 | H01J 37/32082 |
| JP | 2006-286536 | A | | 10/2006 | |
| JP | 2010-131577 | A | | 6/2010 | |
| JP | 2012-55840 | A | | 3/2012 | |
| JP | 2012-158178 | A | | 8/2012 | |
| JP | 2013-171859 | A | | 9/2013 | |
| JP | 2014-75362 | A | | 4/2014 | |
| JP | 2014-216318 | A | | 11/2014 | |
| JP | 2015-5475 | A | | 1/2015 | |
| JP | 2016-144874 | A | | 8/2016 | |
| JP | 2017-123399 | A | | 7/2017 | |
| WO | WO 2009/093700 | A1 | | 7/2009 | |
| WO | WO 2015/151165 | A1 | | 10/2015 | |

OTHER PUBLICATIONS

International Preliminary Report on Patentability, dated Dec. 7, 2023, and English translation of the Written Opinion of the International Searching Authority, dated Aug. 16, 2022, (Forms PCT/IB/326, PCT/IB/373, and PCT/ISA/237) for International Application No. PCT/JP2022/021765.

International Search Report for International Application No. PCT/JP2022/021765, dated Aug. 16, 2022, with English translation.

* cited by examiner

PLASMA GENERATING DEVICE, PLASMA PROCESSING DEVICE, AND PLASMA ETCHING DEVICE FOR SEAMLESS ROLLER MOLD

TECHNICAL FIELD

The present invention relates to a plasma generating device, a plasma processing device, and a plasma etching device for seamless roller mold.

BACKGROUND ART

A plasma generating device is used for various types of processing such as thin-film forming processing of a substrate, ion implantation processing, dry etching processing and the like. An Inductively Coupled Plasma (ICP: Inductively Coupled Plasma) is generated by using a high-frequency circuit having an antenna coil which is an inductive load and a high-frequency power supply and supplying a high-frequency power to the antenna coil.

For example, Patent Document 1 and Patent Document 2 disclose a plasma generating device which processes fine particles by the plasma processing. The plasma generating device includes a reaction container (cylindrical tube) which generates a plasma and in which the fine particles, which are processing targets, flow inside, and a spiral antenna coil which is an inductive load surrounding a periphery of the reaction container and constitutes a high-frequency circuit. The antenna coil induces a standing wave by resonating in a specific wavelength mode and generates an inductive field in the reaction container. As a result, the plasma is generated by the inductive coupling in the reaction container.

In the plasma processing to a processing target as above, it is preferable that plasma with higher density is caused to be generated in a container with a larger capacity in a point that a processing speed of the processing target by the plasma processing can be improved.

Moreover, Patent Document 3 discloses a plasma etching device for roll mold, and in the etching of a roll-shaped base material having a curved surface, it is preferable in a point that the etching is performed in a direction perpendicular to a surface.

CITATION LIST

Patent Document

Patent Document 1: Patent Publication JP 2010-131577A
Patent Document 2: Patent Publication JP 2012-55840A
Patent Document 3: Patent Publication JP 2012-158178A

SUMMARY

Technical Problem

However, with the configuration as in the aforementioned Patent Document 1, Patent Document 2, it was difficult to increase a capacity of a container which causes plasma to be generated.

That is, if the capacity of the container is to be increased, it becomes necessary to increase the winding number of a coil, which is an inductive load, that is, to make the length of the coil longer in accordance with that. On the other hand, it is not reasonable to make the antenna coil longer unlimitedly, since a room for selection of electric elements such as a capacitor which satisfy a resonance condition in the specific wavelength mode is narrowed.

Therefore, in order to solve the aforementioned problem, the present invention has an object to provide a plasma generating device, a plasma processing device, and a plasma etching device for seamless roller mold, which can cause plasma with higher density to be generated in a container with a larger capacity.

Solution to Problem

A plasma generating device according to an embodiment of the present invention is a plasma generating device, including:

- a high-frequency circuit having an inductive load and a high-frequency power supply which supplies high-frequency power to the inductive load; and
- a reaction container which is configured capable of pressure reduction and in which plasma is generated by applying the high-frequency power to the inductive load, in which
- the inductive load is constituted by a spiral antenna coil disposed so as to surround a periphery of the reaction container;
- the antenna coil is divided into at least two or more parts; and
- the high-frequency circuit has a plurality of paths on which each of the antenna coils divided into at least two or more parts is provided.

According to the plasma generating device in the aforementioned mode, by dividing the antenna coil, a coil wire length of each of the antenna coils can be maintained in a predetermined wavelength, and by reducing the inductance, a capacitor which satisfies the resonance condition can be selected. Therefore, the plasma with higher density can be generated in the container with a larger capacity.

In the plasma generating device in the aforementioned mode, the reaction container may have a cylindrical shape having the same axis as that of the antenna coil, and an inner diameter of the reaction container may be smaller than an antenna coil diameter, and the antenna coil may be disposed outside the reaction container.

In the plasma generating device in the aforementioned mode, the reaction container may include a plurality of gas introduction portions which introduce a reaction gas into the reaction container from different positions.

In the plasma generating device in the aforementioned mode, each of the plurality of paths may be connected in parallel to the high-frequency power supply, and the high-frequency circuit may be configured such that the high-frequency power supply supplies high-frequency power in the same frequency band to the plurality of paths.

In the plasma generating device in the aforementioned mode, the high-frequency circuit may include a grounding electrode to which the sides of the plurality of paths opposite to the high-frequency power supply are connected in common.

In the plasma generating device in the aforementioned mode, any one of the plurality of paths may have an adjusting coil on a side opposite to the high-frequency power supply with respect to the antenna coil.

In the plasma generating device in the aforementioned mode, the adjusting coil may be a coil with variable inductance.

In the plasma generating device in the aforementioned mode, each of the plurality of paths may have a capacitor having predetermined impedance on a side opposite to the antenna coil with respect to the adjusting coil.

In the plasma generating device in the aforementioned mode, at least one of the plurality of capacitors may be a capacitor with variable impedance.

In the plasma generating device in the aforementioned mode, each of the plurality of paths may have a plurality of capacitors having predetermined impedance which are disposed in parallel on the same side as that of the adjusting coil when seen from the antenna coil.

In the plasma generating device in the aforementioned mode, at least one of the plurality of capacitors may be a capacitor with variable impedance.

In the plasma generating device in the aforementioned mode, each of the antenna coils may have a winding number larger than that of one winding.

The plasma generating device in the aforementioned mode may be a plasma generating device including a control device having a processor and a memory in which software for executing predetermined processing is stored and controlling the high-frequency circuit, in which the high-frequency circuit has:

a first capacitor with variable impedance provided between the high-frequency power supply and the plurality of paths; and a second capacitor with variable impedance, branching from between the high-frequency power supply and the first capacitor and having the other end provided on the path connected to the grounding electrode, in which the memory stores a program for adjusting capacitances of the first capacitor and the second capacitor;

the memory further stores a reference data table including an output of the high-frequency power supply and an initial value and a target value of capacitance of each of the first capacitor and the second capacitor corresponding to the output; and the control device adjusts the capacitances of the first capacitor and the second capacitor on the basis of the program and the reference data table.

In the plasma generating device in the aforementioned mode, the memory may further store information relating to a variation degree when the capacitances of the first capacitor and the second capacitor are adjusted; and a controller may further adjust the capacitances of the first capacitor and the second capacitor on the basis of the variation degree.

Another embodiment of the present invention is a plasma processing device including a high-frequency circuit having an inductive load and a high-frequency power supply which supplies high-frequency power to the inductive load and a reaction container which is configured capable of pressure reduction and in which plasma is generated by applying the high-frequency power to the inductive load, in which the inductive load is constituted by a spiral antenna coil disposed so as to surround a periphery of the reaction container;

the antenna coil is divided into at least two or more parts;

the reaction container includes a processing-target accommodating portion for accommodating a processing target; and the processing-target accommodating portion is disposed inside a space surrounded by the antenna coil.

A reaction container in the plasma processing device in the aforementioned mode may further include a plurality of gas introduction portions which introduce a reaction gas into the reaction container from different positions.

Still another embodiment of the present invention is a plasma etching device for seamless roller mold, including a high-frequency circuit having an inductive load and a high-frequency power supply which supplies high-frequency power to the inductive load and a reaction container configured capable of pressure reduction and in which plasma is generated by applying the high-frequency power to the inductive load, in which the inductive load is constituted by a spiral antenna coil disposed so as to surround a periphery of the reaction container;

the antenna coil is divided into at least two or more parts;

the reaction container includes a processing-target accommodating portion for accommodating a processing target; and the processing-target accommodating portion is disposed inside a space surrounded by the antenna coil.

The reaction container in the plasma etching device for seamless roller mold in the aforementioned mode may further include a plurality of gas introduction portions which introduce a reaction gas into the reaction container from different positions.

Advantageous Effects of Invention

According to the present invention, the plasma generating device, the plasma processing device, and the plasma etching device for seamless roller mold, which can cause plasma with higher density to be generated in a reaction container with a larger capacity can be provided.

DESCRIPTION OF EMBODIMENTS

Hereinafter, a configuration of this disclosure will be explained in detail on the basis of an example of an embodiment shown in drawings.

Figure 1:
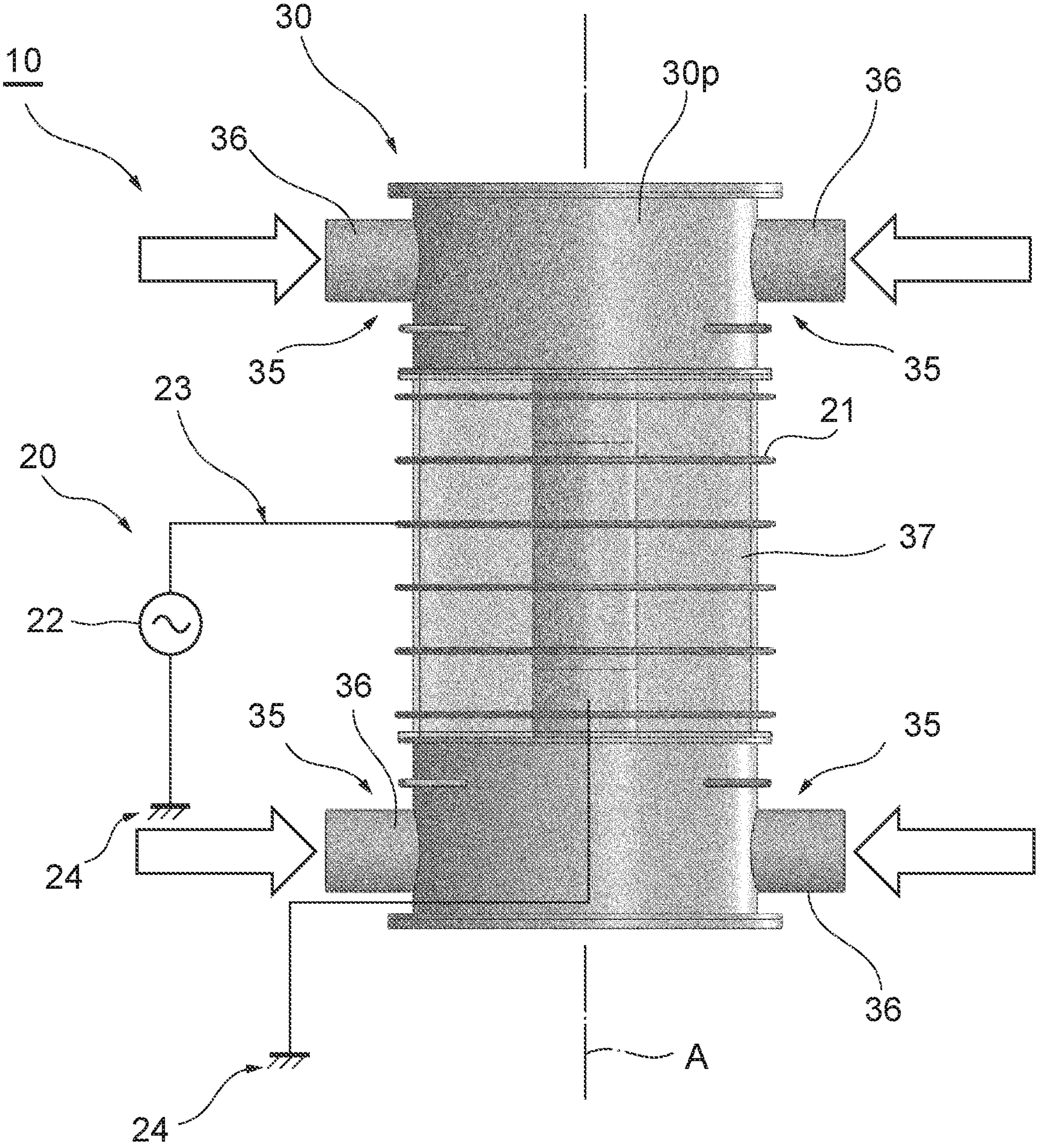
FIG. 1 is an entire view illustrating an outline of a plasma generating device according to this disclosure.

FIG. 1 and the like illustrate an example of a plasma generating device according to this disclosure. The plasma generating device 10 is a device which can be used as a device for generating plasma when etching processing is executed for a mold as a processing target, for example. As an example, the plasma generating device 10 as a roll dry etching (RDE) device is configured to make a gas (SF6, O2, for example) introduced into a discharge tube 37 through a gas introduction tube 36 into plasma by a magnetic field/inductive electrolysis generated in an antenna coil 21 as an inductive load so that fine irregularity can be formed on a surface of a mold 100 by using an ionized ion (fluorine ion) (see FIG. 1, FIG. 2 and the like)

A type, a configuration and the like of the mold 100 as a processing target are not particularly limited, and a seamless roller mold (seamless cylindrical plate) or the like is included. Though detailed explanation is omitted, the seamless roller mold is a plate on which a pattern is formed without a seam on an entire circumferential surface so as to be suitable for high-resolution roll-to-roll reverse offset print, high-definition roll-to-roll imprint and the like. The plasma generating device used for surface processing (plasma processing) of the seamless roller mold as above can be used as a plasma processing device or a plasma etching device for seamless roller mold.

First Embodiment

The plasma generating device 10 in this embodiment, which is an example of the device as above, will be explained below. The plasma generating device 10 of this embodiment is constituted as a device including a high-frequency circuit 20, a reaction container 30, a control device 40 and the like (see FIG. 4 and the like). The high-frequency circuit 20 includes an antenna coil 21, a high-frequency power supply 22, a path 23, a grounding electrode 24 and the like. Moreover, the high-frequency circuit 20 may include an adjusting coil Ls, a variable capacitor $C_T$, a variable capacitor $C_L$ and the like.

The high-frequency circuit 20 in this disclosure includes the antenna coil, which is an inductive load for generating plasma and the high-frequency power supply 22 which supplies high-frequency power to the antenna coil. Moreover, the high-frequency circuit 20 in this disclosure includes the first variable capacitor $C_T$ provided on the path 23 between the antenna coil and the high-frequency power supply and the second variable capacitor $C_L$ provided on the path 23 branching from the path 23 between the variable capacitor $C_T$ and the high-frequency power supply and having the other end connected to the grounding electrode 24.

In the high-frequency circuit 20, the path 23 on a side opposite to the high-frequency power supply 22 branches with respect to the variable capacitor $C_T$, a first antenna coil 21*a* is provided on a first path 23*a*, and a second antenna coil 21*b* is provided on a second path 23*b*. The other ends of the antenna coils 21*a*, 21*b* are connected to the grounding electrode 24. Moreover, the high-frequency power supply 22 is connected to the grounding electrode 24.

The antenna coil 21 is a coil which causes the magnetic field/inductive electrolysis to be generated in accordance with the high-frequency power supplied from the high-frequency power supply 22 and makes the gas into plasma. The antenna coil 21 is constituted by a spiral coil disposed so as to surround a space in the reaction container 30 so as to make the gas around the mold 100 accommodated in the reaction container 30 into plasma (see FIG. 4). The coil winding number of the antenna coil 21 is a one or larger.

The high-frequency power supply 22 is a power supply which supplies (applies) high-frequency power to the antenna coil 21.

The path 23 is provided so as to constitute a circuit by electrically connecting the antenna coil 21, the high-frequency power supply 22 and the like.

The grounding electrode 24 is provided at a predetermined spot of the path 23 so as to ground a part of the high-frequency circuit 20.

The variable capacitor $C_T$ is a capacitor with variable impedance, provided between the high-frequency power supply 22 and the antenna coil 21. The variable capacitor $C_L$ is provided on the path branching from between the high-frequency power supply 22 and the variable capacitor $C_T$ in the middle of the path 23. The other end side of the variable capacitor $C_L$ (the side opposite to the end part connected to the high-frequency power supply 22 and the like) is connected to the grounding electrode 24 (24*c*) (see FIG. 4).

The reaction container 30 is a container configured capable of pressure reduction. Inside the reaction container, a mold accommodating portion 31 in which the mold 100 is accommodated and a gas flow path 32 formed around the mold accommodating portion 31 are provided (see FIG. 2). The reaction container 30 of this embodiment has a cylindrical shape around an axis A (see FIG. 1, FIG. 2), and an inner diameter thereof is provided so as to be smaller than a diameter of the antenna coil 21. That is, the antenna coil 21 is disposed on an outer side of the reaction container 30. By having the configuration as above, the antenna coil 21 is not directly exposed to plasma and thus, such a situation that residues at generation of the plasma adhere to the antenna coil, which causes density of the generated plasma ununiform, can be suppressed.

Moreover, the antenna coil 21 in this embodiment is preferably disposed on the outer side of the reaction container 30 so that a center of the spiral overlaps the axis A. That is, the axis of the antenna coil 21 is preferably disposed so as to be the same as the axis A of the reaction container 30. By having the configuration as above, the plasma with uniform density can be generated in both directions of a circumferential direction and an axial direction in the reaction container.

Moreover, in this embodiment, the mold accommodating portion (processing-target accommodating portion) 31 having a cylindrical shape is disposed on an inner side of the space surrounded by the antenna coil 21. By having the configuration as above, even when a mold (processing target) with a large area is a target, the whole surface thereof can be subjected to the plasma processing, which is preferable, and when the mold 100 has a cylindrical shape, the entire circumference can be subjected to the plasma processing at the same time and uniformly on the entire length of the mold, which is particularly preferable.

In addition, the axis at the center of the mold accommodating portion (processing-target accommodating portion) 31 is preferably matched with the axis A of the reaction container 30. By having the configuration as above, a volume of the gas flow path around the mold 100 is made equal in the circumferential direction, and uniform plasma can be generated and thus, the whole surface of the mold 100 can be subjected to the plasma processing equally.

Figure 2:
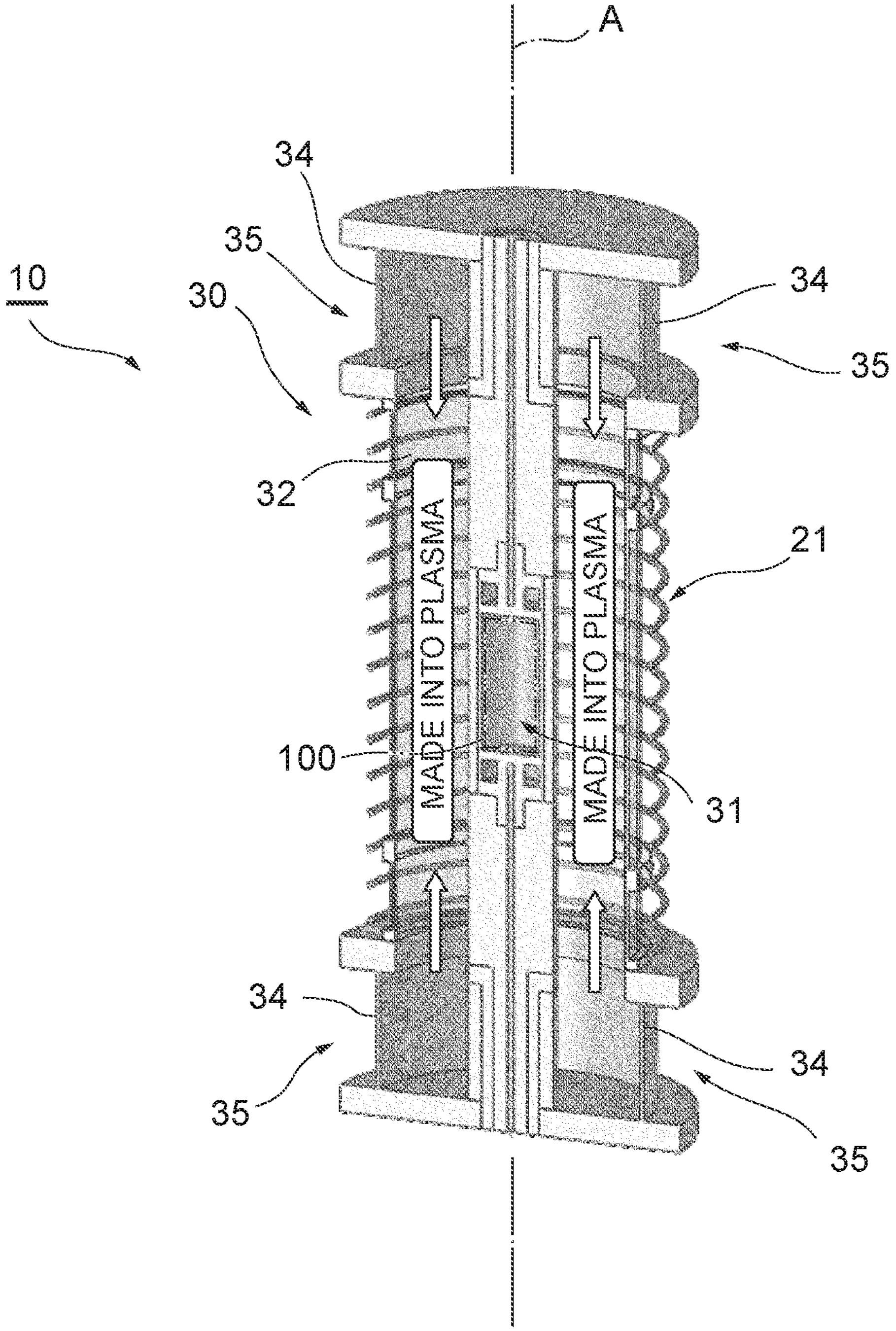
FIG. 2 is a perspective view illustrating an internal configuration in a vertical section of a reaction container of the plasma generating device.

The gas introduction portion 35 is a part for introducing a reaction gas (SF6, O2, for example) into the discharge tube 37 and is constituted by a gas introduction hole 34 and the like provided in a peripheral wall 30*p* of the reaction container 30, for example (see FIG. 2). To the gas introduction portion 35, the gas introduction tube 36 is connected (see FIG. 1). The gas introduction portion 35 may be provided in plural. The reaction container 30 in this embodiment includes four spots of the gas introduction portions 35 (see FIG. 1 and the like). Since the reaction gas is consumed as plasma, if there is only one spot of the gas introduction portion 35, a difference can be generated in a supply amount of the reaction gas between a position closer to the gas introduction portion 35 and a position away from that. In this point, by providing a plurality of the gas introduction portions 35 for introducing the reaction gas into the reaction container 30 from different positions as in this embodiment, plasma with more uniform density can be generated in the reaction container 30. When a plurality of the gas introduction portions 35 are to be provided as above, it is more preferable that a plurality of the gas introduction portions 35 are provided at positions away in the axis A direction of the reaction container 30, and it is further preferable that the gas introduction portions 35 are disposed so that the reaction gas flows at least from two directions opposed to each other toward the discharge tube 37. Note that, even if the reaction gas flows in a radial direction of the reaction container in the vicinity of the gas introduction portion 35, it is possible to be configured that the more uniform plasma is generated by the gas flowing from the two directions opposed to each other along the axis direction of the reaction container toward the discharge tube 37 after that. In this embodiment, the gas introduction portion 35 is disposed closer to the outer side than both ends of the mold accommodating portion 31 along the positions away in the axis A direction of the reaction container 30, whereby more uniform plasma is generated (see FIG. 2 and the like).

Moreover, when the mold accommodating portion (processing-target accommodating portion) 31 is provided on the inner side of the reaction container 30 as in this embodiment, by providing a plurality of the gas introduction portions 35 for introducing the reaction gas into the reaction container 30 from different positions, the plasma with more uniform density can be generated in the reaction container 30, and uniform plasma processing of the mold 100, which is the processing target, can be realized. When the plurality of gas introduction portions 35 are provided as above, it is more preferable that the plurality of gas introduction portions 35 are provided at positions away in the axis A direction of the reaction container 30, and it is further preferable to dispose the gas introduction portions 35 so that the reaction gas flows at least from the two directions opposed to each other toward the discharge tube 37. In addition, when the plurality of gas introduction portions 35 are disposed closer to the outer side than the both end parts of the mold accommodating portion (processing-target accommodating portion) 31 with respect to the axis A direction of the reaction container 30, the supply amount of the reaction gas supplied to the periphery of the mold 100 is made more equal, whereby uniform plasma processing can be realized.

In this embodiment, if an exhaust pipe (not shown) which connects the reaction container 30 to a vacuum pump capable of pressure reduction is at a position equally away from the plurality of gas introduction portions 35 described above, it becomes difficult for a reaction product after the plasma processing to stay in the reaction container 30, which is more preferable.

<Antenna Coil>

Conventionally, in a scene of an etching process for manufacturing a cylindrical plate for printing by generating a fine pattern on the order of sub microns on a surface of a cylindrical plate material, in order to realize the need for processing a processing target larger than the processing target in the past plasma processing (plasma processing of fine particles, an etching process of a semiconductor wafer), plasma with higher density needs to be generated in a container with a larger capacity. As a specific example, it is such a case that depth etching is to be realized by applying an ICP (Inductively Coupled Plasma) type inductive coupled plasma with higher plasma density and a larger etching rate to a mold with a large-width roll and the like.

Figure 3:
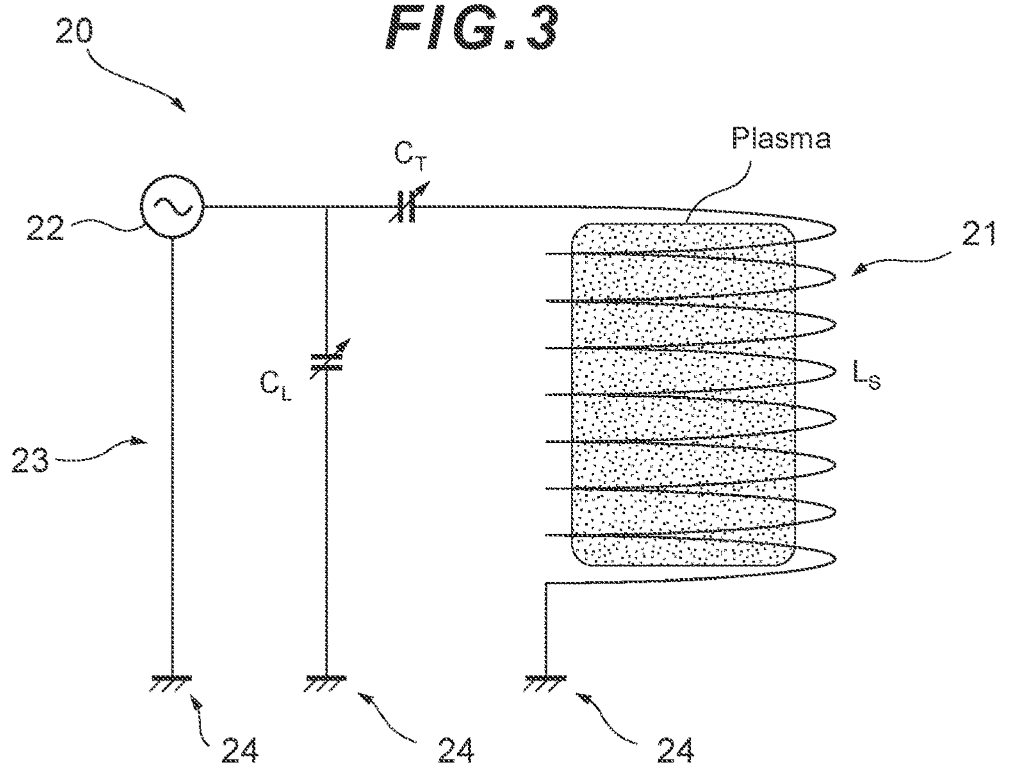
FIG. 3 is a diagram illustrating an example of a high-frequency circuit in a conventional plasma generating device as a reference.
Figure 5:
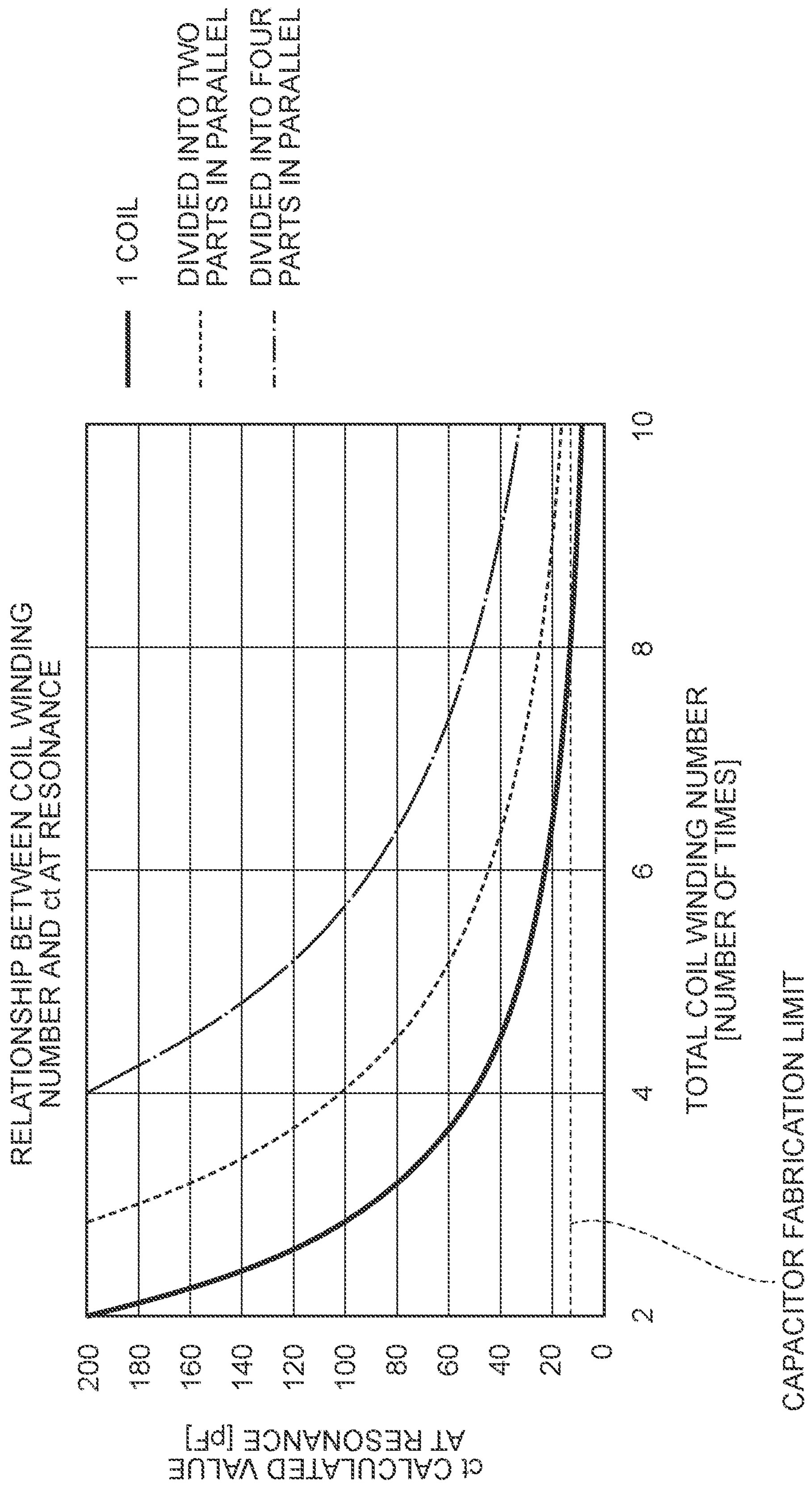
FIG. 5 is a graph illustrating a relationship between a coil winding number and an electrostatic capacity (Ct) of a capacitor at resonance.

By the way, when plasma is to be generated in a container with a large capacity, the inductive load becomes larger with that (that is, the coil winding number becomes larger) and thus, the coil length of the antenna coil becomes longer, and the coil wire length becomes longer (see FIG. 3). However, in order to generate plasma in the plasma generating device 10 in general, it is necessary to satisfy the following resonance condition and to create a resonant state (see Formula 1, FIG. 5):

$$\omega = \frac{1}{\sqrt{LC}} \quad \text{[Math. 1]}$$

ω: Power-supply frequency [rad/s]

C: Electrostatic capacitance [F]

L: Inductance of coil [H]

In the light of Formula 1, if the coil length of the antenna coil 21 is increased, the inductance L becomes larger, and it becomes difficult to employ the capacitor with the electrostatic capacitance C satisfying Formula 1. That is, since the coil winding number (coil length) needs to satisfy the resonance condition, it cannot be made longer without a limit. Then, in view of a value of the capacitance of the capacitor which can be used in the resonance circuit (LC circuit), it has a limitation. Specifically, since the electrostatic capacitance of the capacitor which can be realized is approximately 10 pF or more, a size of the inductance L which satisfies the above is limited. As described above, there is a restriction on the size of the inductance L, or in other words, the length of the antenna coil 21 from the resonance condition and the value of the capacitance of the usable capacitor. Moreover, there is a restriction on the length of the antenna coil 21 by the nature of the impedance of the coil length with respect to a wavelength λ of the high-frequency power. This can be explained as follows. That is, by assuming the coil length of the antenna coil 21 is S, and the wavelength of the high-frequency power is λ:

[Math. 2]

Figure 6A:
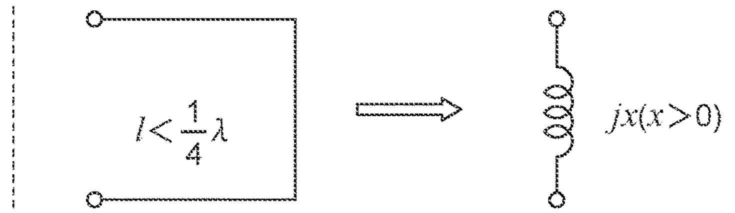
FIGS. 6A to 6C are diagrams for explaining a change by a length of input impedance at a short-circuit load.

Though an inductive input impedance can be obtained (see FIG. 6A) at the time when $S<\lambda/4$,

[Math. 3]

Figure 6B:
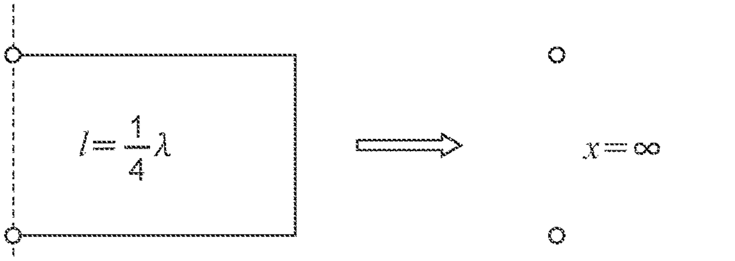

At the time when $S=\Delta/4$ (see FIG. 6B) or

[Math. 4]

Figure 6C:
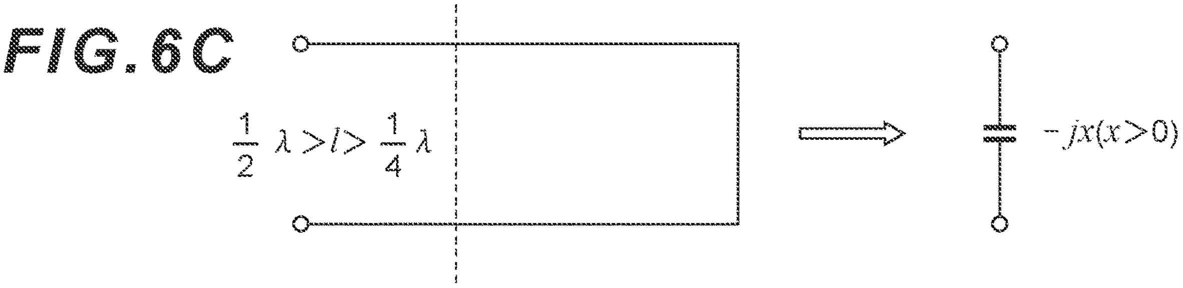

At the time when $S>\lambda/4$ (see FIG. 6C), power is not applied or a capacitive state is brought about, and the ICP type is not maintained or the like. In essential, when the coil length S of the antenna coil becomes a ¼ wavelength of the frequency of the power applied to the antenna coil (approximately 3.8 m, when the power of 13.56 MHz is applied to a copper pipe coated with Teflon (Registered Trademark), for example) or more, a part in which a potential difference becomes 0 V is generated in the coil, and such a phenomenon that plasma is not generated occurs. Moreover, when the winding number of the antenna coils is increased or the coil wire length is made longer, the inductance L of the antenna coil becomes larger, the capacitance satisfying the resonance condition becomes smaller and could become such a small value that cannot be handled by a (generally usable) commercially available capacitor depending on the cases, and it loses touch with a realistic value. Specifically, if the frequency of the high-frequency power is 13.56 MHz as above, for example, the wavelength λ is 22 m and thus, 0 to λ/4, which is a range of the coil wire length S is 0 to 5.5 m. Moreover, it is preferable to set the coil length to a range of 0 to 3.8 m, obtained by multiplying the 0 to λ/4 value by a shortening coefficient. Here, the shortening coefficient is a speed coefficient expressed by a ratio between a speed at which an electric wave advances in the vacuum and a speed at which the electric wave advances in a conductor covered with an insulating body or the like.

Figure 4:
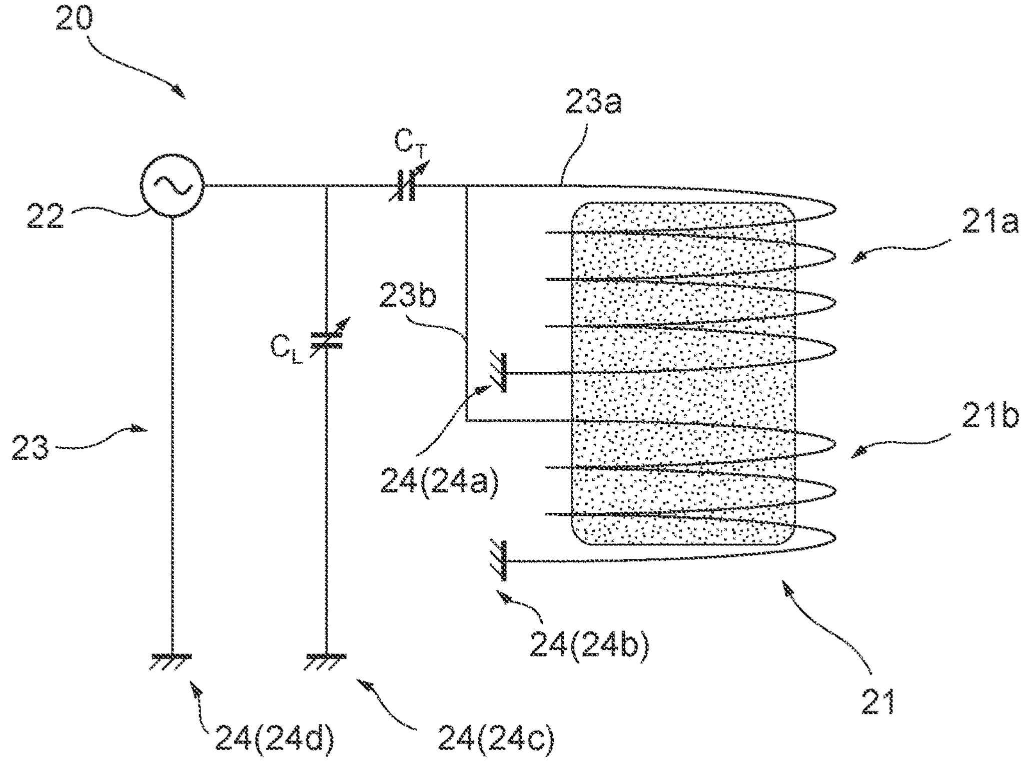
FIG. 4 is a diagram illustrating an example of the high-frequency circuit of the plasma generating device according to this disclosure.

By the way, in the plasma generating device 10 of this embodiment, antenna coils 21*a*, 21*b* with a configuration divided into two parts are employed as the antenna coils 21, and the coil wire lengths of the respective antenna coils 21*a*, 21*b* are kept within a ¼ wavelength of the wavelength λ of the high-frequency power supply so as to make the inductance of the entire antenna coil small (see FIG. 4). By dividing the antenna coil as above, while the coil length as the entire antenna coil is long, the inductance L of each of the coils is made small, which makes it possible to select a capacitor which satisfies the resonance condition and to generate plasma. Moreover, the frequency of the high-frequency power to be supplied (applied) to the antenna coil can be also maintained in a high band.

Therefore, the request for realization of the deep etching by applying the ICP (Inductively Coupled Plasma) type inductive coupled plasma with high plasma density and a high etching rate to the mold 100 with a wide-width roll can be met by generation of the plasma with high density in the reaction container 30 with a larger capacity.

These antenna coils 21*a*, 21*b* divided into two parts are provided on separate paths (indicated by reference numerals 23*a*, 23*b* in FIG. 4), respectively (see FIG. 4). Each of these plural paths 23*a*, 23*b* is connected in parallel to the high-frequency power supply 22. To the antenna coils 21*a*, 21*b* provided on each of the paths 23*a*, 23*b*, the high-frequency power in the same frequency band is supplied (applied) from the high-frequency power supply 22 through the paths 23*a*, 23*b* (see FIG. 4). As described above, by connecting the plurality of antenna coils 21 to the one high-frequency power supply 22 in parallel, interference between the coils can be ignored.

That is, when plasma is to be generated by using the plurality of coils, it can be so configured that each of the plurality of coils is connected to separate high-frequency power supplies (using a plurality of the high-frequency power supplies). However, when the high-frequency power supply and the coil are connected in a one-to-one manner (using a plurality of the high-frequency power supplies), depending on a disposed state of the inductive load, variable magnetic fields generated in a plurality of the inductive loads or inductive electric fields generated by the variable magnetic fields interfere with each other (a coupling coefficient of the inductive load is large), and plasma is not generated from the inductive load in some cases. Particularly, when each of the plurality of coils is disposed so as to surround a periphery of the reaction container, a magnetic flux inside the spiral coil with relatively large density influences the magnetic flux of the adjacent another coil. Thus, the magnetic flux generated by one of the adjacent coils influences the magnetic flux of the other coil, whereby a degree of interference between the coils becomes large (the coupling coefficient K becomes large), and plasma is not generated from the inductive load in some cases. Note that the coupling coefficient K is a non-dimensional number indicating a degree of coupling between a primary winding and a secondary winding, and when the coils are aligned horizontally with each other it becomes smaller, while when they are aligned perpendicularly as in this embodiment, it becomes larger. Moreover, the farther the distance is separated, the lower the magnetic flux density becomes, and the coupling coefficient K also becomes lower. The largest coupling coefficient K is 1. When the coils are aligned perpendicularly and the distance is close, the interference of the magnetic flux becomes larger, and a value of the coupling coefficient K rises. As described above, when the degree of interference between the adjacent coils is large, such a measure can be taken, for example, that the high-frequency current to be supplied to the one antenna coil is varied, but it is difficult in many cases to vary the high-frequency current in the high-frequency band as 13.56 MHz so as to suppress the influence of the magnetic flux between the adjacent coils. Moreover, when the high-frequency current to be supplied to the one antenna coil is varied, the interferences of the variable magnetic field generated between the coils and the inductive electric field vary the high-frequency current conducted in the high-frequency circuit and as a result, it causes deterioration of the other high-frequency power supply device in some cases. In view of this point, according to the plasma generating device 10 of this embodiment in which the plurality of antenna coils 21 are connected in parallel to the one high-frequency power supply 22, the interference between the coils can be ignored.

One end of the antenna coil 21*a* is grounded on the grounding electrode 24*a*, and one end of the antenna coil 21*b* is grounded on the grounding electrode 24*b* (see FIG. 4). Though not particularly shown, it may be so configured that the path 23*a* and the path 23*b* are merged in the middle and grounded on the single grounding electrode.

Second Embodiment

A second embodiment of the plasma generating device 10 will be explained (see FIG. 7).

Figure 7:
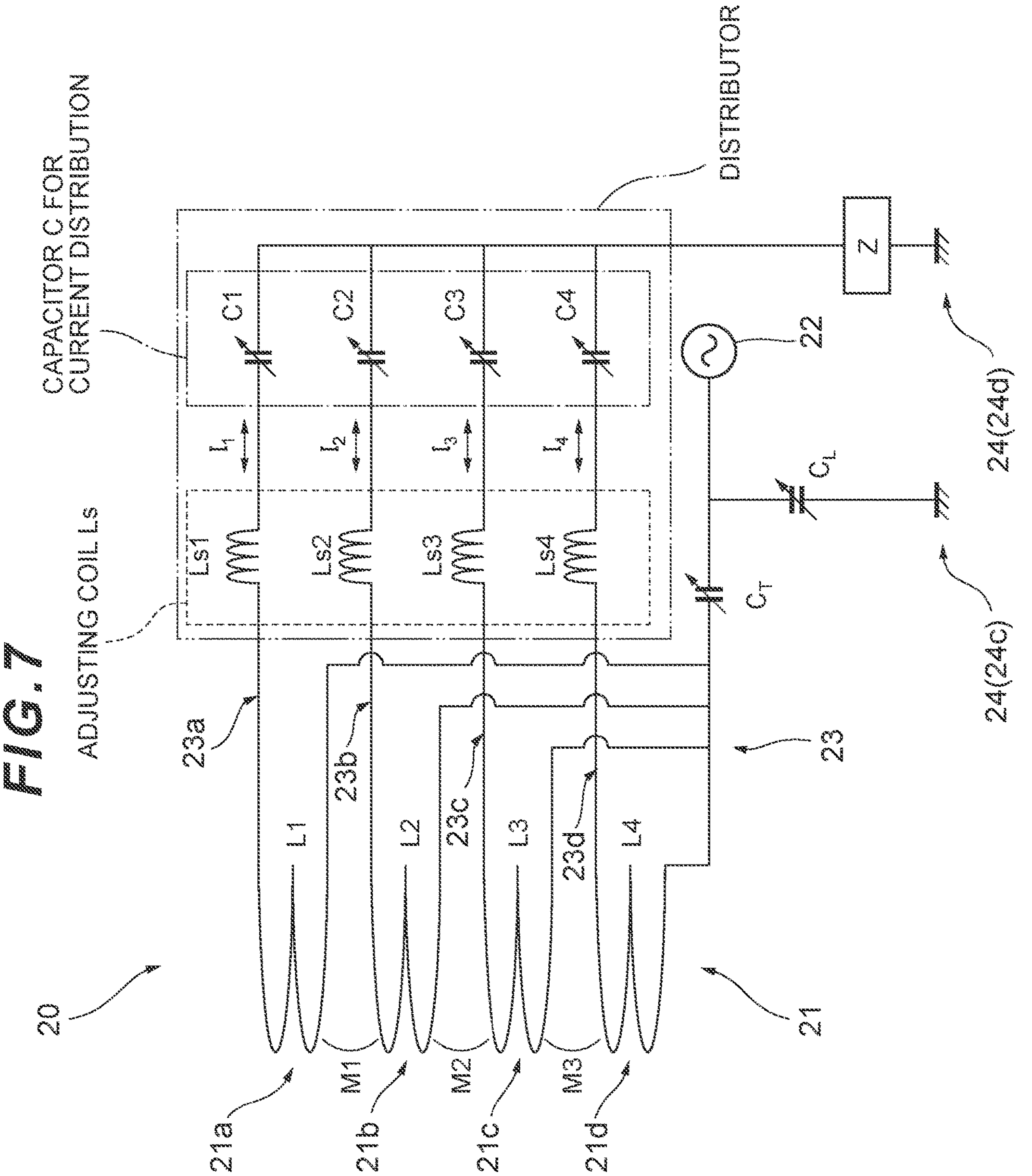
FIG. 7 is a diagram illustrating a high-frequency circuit of a plasma generating device in a second embodiment of this disclosure.

The plasma generating device 10 of this embodiment includes antenna coils 21*a* to 21*d* divided into four parts as the antenna coils 21 (see FIG. 7). The inductances of the antenna coils 21*a* to 21*d* are L1, L2, L3, L4, respectively. Moreover, a mutual inductance between the antenna coil 21*a* and the antenna coil 21*b* is M1, the mutual inductance between the antenna coil 21*b* and the antenna coil 21*c* is M2, and the mutual inductance between the antenna coil 21*c* and the antenna coil 21*d* is M3 (see FIG. 7).

These antenna coils 21*a* to 21*d* are provided on each of the plurality of paths 23*a* to 23*d* and are disposed in parallel (see FIG. 7). The number of units of the high-frequency power supply 22 is one as in the aforementioned embodiment, and the high-frequency power in the same frequency band is supplied (applied) to the antenna coils 21*a* to 21*d* provided on each of the paths 23*a* to 23*d* from the high-frequency power supply 22.

In at least any one of these plural paths 23*a* to 23*d*, the adjusting coil Ls may be provided at a position opposite to the high-frequency power supply 22 when seen from the antenna coils 21*a* to 21*d*. In the plasma generating device 10 of this embodiment, the adjusting coils Ls1, Ls2, Ls3, Ls4 with variable inductance are provided on each of the paths 23*a* to 23*d* (see FIG. 7). As described above, the coil winding number of the antenna coil 21 is determined in accordance with the capacity of the plasma to be generated, but if the coil winding number is too large, the electrostatic capacitance (capacitance) C satisfying the resonance condition becomes smaller, and a generally usable capacitor as those available in the market cannot handle it anymore depending on the cases and thus, the coil winding number (length) has a restriction (see Formula 1). Here, on the basis of the aforementioned condition of the coil winding number (length), the lengths of the antenna coils 21*a* to 21*d* are determined, and the ranges of the inductances L1 to L4 of the respective antenna coils are determined. However, by providing a plurality of the antenna coils 21, as compared with the case where there is one piece of the antenna coil, the length of each of the antenna coils 21*a* to 21*d* becomes relatively short, whereby the inductance becomes smaller in some cases. As a result, there was such a case that the adjustment of the high-frequency circuit so as to satisfy the predetermined resonance condition becomes difficult only by varying the capacitance of the variable capacitor $C_T$. In this point, according to the plasma generating device 10 including the adjusting coils Ls1, Ls2, Ls3, Ls4, by adjusting these adjusting coils Ls so as to vary synthetic inductance in the high-frequency circuit 20, a generally usable capacitor becomes capable of handling it (that is, desired plasma can be generated). Moreover, these adjusting coils Ls1, Ls2, Ls3, Ls4 function as so-called distributors, which can adjust an amount (distributed amount) of the high-frequency current flowing in each of the plurality of paths 23*a* to 23*d*.

Moreover, on each of the plurality of paths 23*a* to 23*d* of the plasma generating device 10, the capacitors C1, C2, C3, C4 for current distribution having predetermined impedance are provided (see FIG. 7). In this embodiment, these capacitors C1, C2, C3, C4 for current distribution are disposed on a side opposite to the antenna coils 21*a*, 21*b*, 21*c*, 21*d* when seen from the aforementioned adjusting coils Ls1, Ls2, Ls3, Ls4 (see FIG. 7). Even in a case that adjustment cannot be made in a proper range, though the variable inductance coils, which are sold in the market or are manufactured, were used as the aforementioned adjusting coils Ls1, Ls2, Ls3, Ls4, the adjustment can be made by varying the amount (distributed amount) of the high-frequency current flowing in each of the plural paths 23*a* to 23*d* by these capacitors C1, C2, C3, C4 for current distribution. As described above, at least any one of these capacitors C1, C2, C3, C4 for current distribution functioning as so-called distributors may be variable capacitors with variable impedance.

The plasma generating device 10 of this embodiment further includes the variable capacitor $C_T$, the variable capacitor $C_L$, and a common impedance Z (see FIG. 7). The variable capacitor $C_T$ is a capacitor with variable impedance provided at a position between the high-frequency power supply 22 and (each of the antenna coils 21*a*, 21*b*, 21*c*, 21*d* provided on) the plural paths 23*a*, 23*b*, 23*c*, 23*d*. The variable capacitor $C_L$ is a capacitor with variable impedance provided on the path branching from between the high-frequency power supply 22 and the variable capacitor $C_T$ in the middle of the path 23. The other end side of the variable capacitor $C_L$ (side opposite to the end part connected to the high-frequency power supply 22 and the like) is connected to the grounding electrode 24 (24*c*) (see FIG. 7).

The common impedance Z is present between the capacitors C1, C2, C3, C4 for current distribution and the grounding electrode 24. In the plasma generating device 10 in this embodiment, this common impedance Z is provided in the middle of the single path in which the paths 23*a* to 23*d* are merged (see FIG. 7).

Third Embodiment

In the plasma generating device 10 in the aforementioned first embodiment or second embodiment, it is also suitable to execute predetermined control by using a control device. Hereinafter, the plasma generating device 10 including the control device will be explained as the third embodiment (see FIG. 8 and the like).

Figure 8:
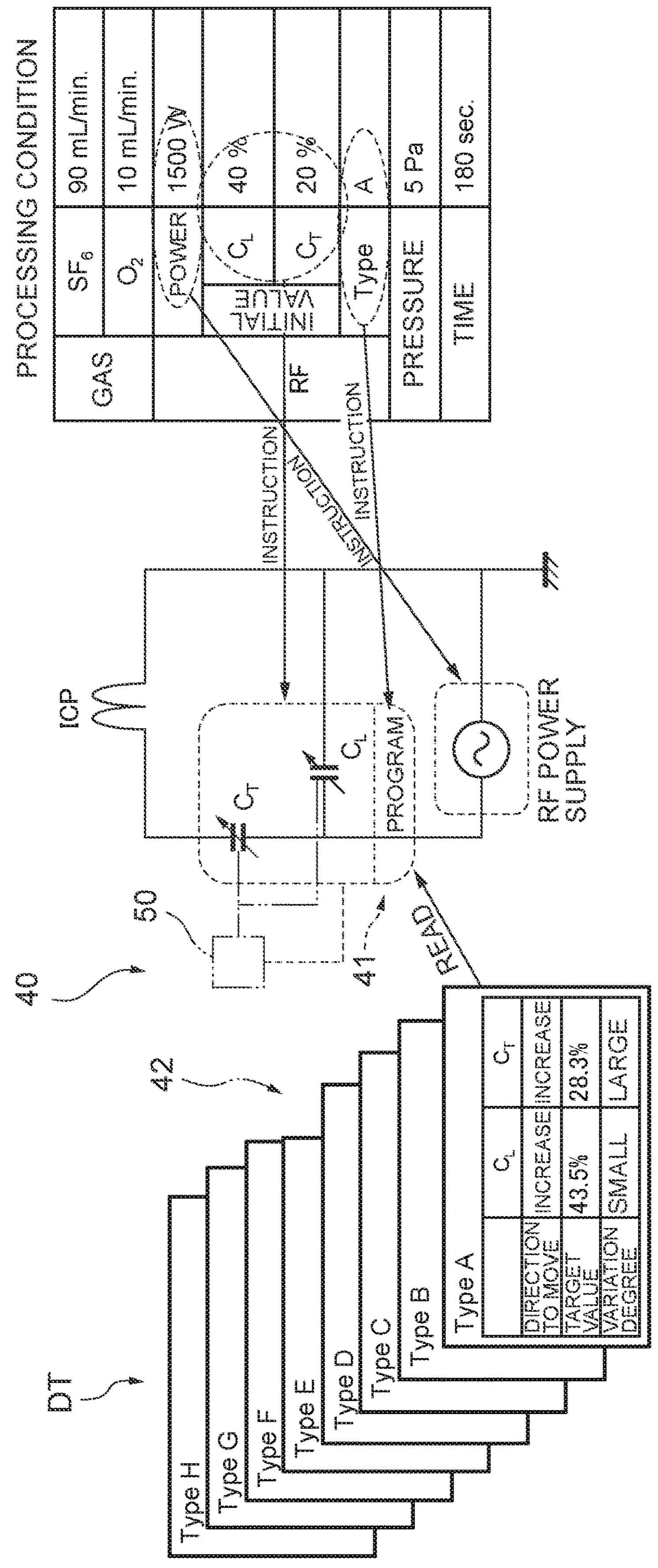
FIG. 8 is a diagram for explaining an adjusting method of the control device and the high-frequency circuit of the plasma generating device in a third embodiment of this disclosure.

The plasma generating device 10 of this embodiment includes the control device 40 configured by a processor (computer) 41 and a memory 42 (see FIG. 8). In the memory 42, a program for executing predetermined processing (software) and a reference data table DT are memorized/stored.

The control device 40 is an arithmetic device which adjusts capacitances of the variable capacitor $C_T$, variable capacitor $C_L$ by execution of the program by the processor 41. On the basis of the program, the processor 41 operates an actuator 50 so as to adjust the capacitances of the variable capacitor $C_T$, variable capacitor $C_L$. Note that the actuator 50 may be provided in common for the variable capacitors $C_T$, $C_L$ or may be provided for each of the variable capacitors.

In the reference data table DT, data to which the processor 41 refers when processing predetermined procedures is described. The reference data table DT in this embodiment includes an output of the high-frequency power supply 22, an initial value and a target value of the capacitance of each of the variable capacitors $C_T$, $C_L$, and information related to a variation degree when the capacitances of the variable capacitors $C_T$, $C_L$ are adjusted (see FIG. 8). The information related to the variation degree includes information related to how to raise a numerical value from the initial value to the target value (variation degree) at adjustment of the capacitance, obtained on the basis of responsiveness to an instruction, transient characteristics and the like, for example.

Figure 9:
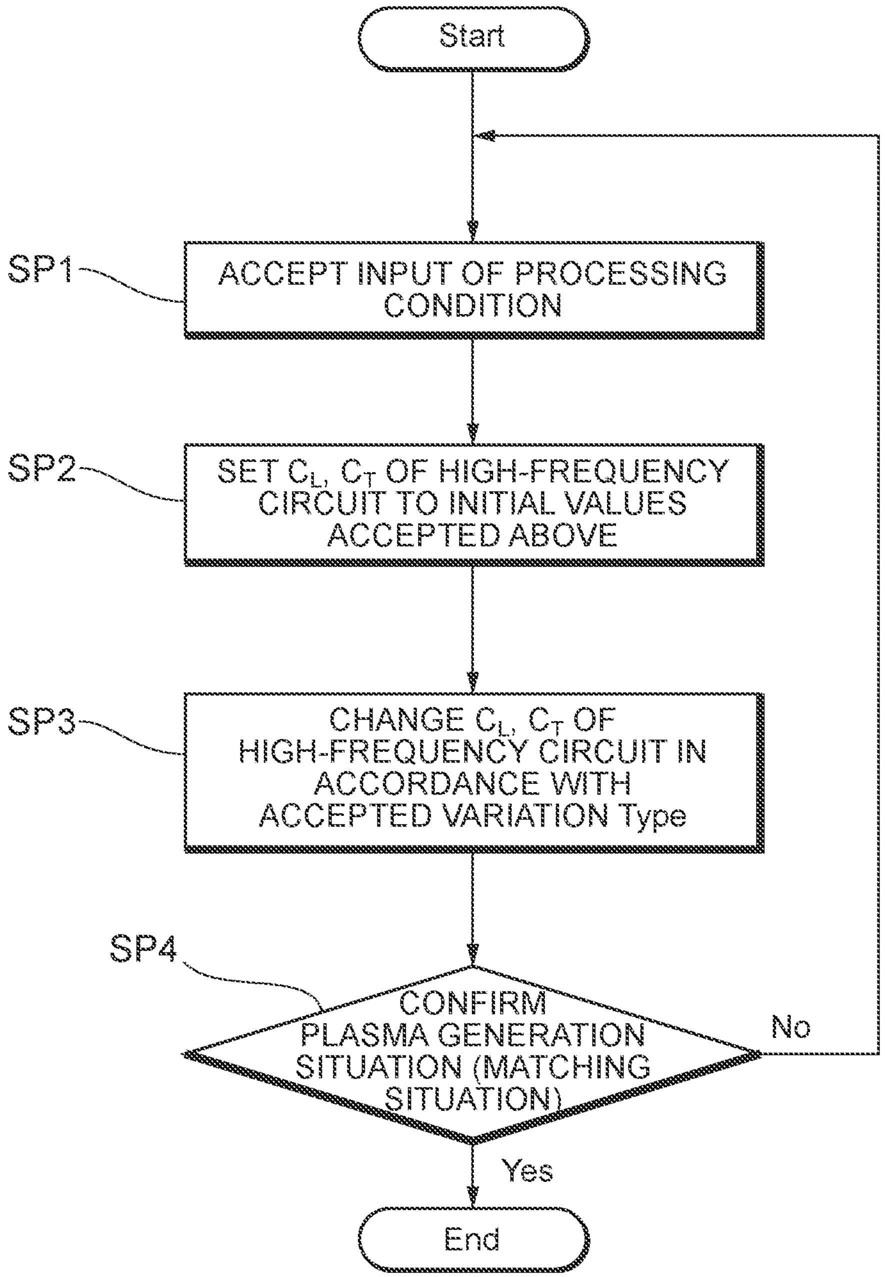
FIG. 9 is a flowchart illustrating an example of capacitance adjustment processing of variable capacitors $C_T$, $C_L$ by the control device of the plasma generating device.

The capacitance adjustment processing of the variable capacitors $C_T$, $C_L$ by the control device 40 will be exemplified and explained (see FIG. 9).

After the adjustment processing is started, the control device 40 accepts an input of a processing condition (Step SP1). The processing condition includes various conditions such as a type of a used gas, a power value of the high-frequency power supply 22, the capacitance initial values of the variable capacitors $C_T$, $C_L$ (percentage in an initial stage) and a variation Type, a pressure in a steady state, plasma generation time in the steady state and the like (see FIG. 8).

The aforementioned "variation Type" is obtained by patterning and categorizing processing procedures when the capacitances of the variable capacitors $C_T$, $C_L$ are adjusted and is set from and associated with the processing condition. The control device can output an instruction signal so that an optimal processing procedure is executed by referring to the "variation Type" associated with the processing condition at that point of time (see FIG. 8).

The control device 40 which accepted the input of the processing condition sets the capacitances of the variable capacitors $C_T$, $C_L$ of the high-frequency circuit 20 on the basis of the "capacitance initial value" in the processing condition (Step SP2).

Subsequently, the control device 40 changes the capacitances of the variable capacitors $C_T$, $C_L$ in accordance with the "variation Type" in the processing condition (Step SP3).

After that, the control device 40 confirms whether a plasma generation situation (in other words, a situation indicating whether it matches a predetermined condition or not) is appropriate or not (Step SP4). Whether the plasma generation situation (matching situation) is appropriate or not can be automatically determined on the basis of a reflected power value and/or presence/absence of plasma emission, for example. The reflected power value can be measured by an SWR meter (not shown) which converts an electromotive force of a detection circuit generated by a current of a feed line (a part of the path 23) supplying power to the antenna coil 21 to power and displays it, for example. According to the SWR meter, a traveling (incident) wave: high-frequency power from the high-frequency power supply 22 toward the antenna coil 21 and a reflected wave (reflected wave power) generated with the generation of plasma can be both measured. Note that, though it was explained as "automatic determination" in this embodiment, it may be so configured that the reflected power value and/or a degree of plasma emission (illuminance, emission spectrometry) are presented, and a user makes a final determination on whether it is appropriate or not.

If it is determined at Step SP4 that the plasma generation situation is appropriate (Yes at Step SP4), a series of the adjustment processing is finished. On the other hand, if it is determined not to be appropriate (No at Step SP4), the processing returns to Step SP1, and the aforementioned processing procedure is repeated.

In the plasma generating device 10 in this embodiment, by having the reference data table DT as above, plasma can be generated stably even under a condition that the plasma generation situation (matching situation) is largely different.

Fourth Embodiment

A fourth embodiment of the plasma generating device 10 will be explained (see FIG. 11).

Figure 11:
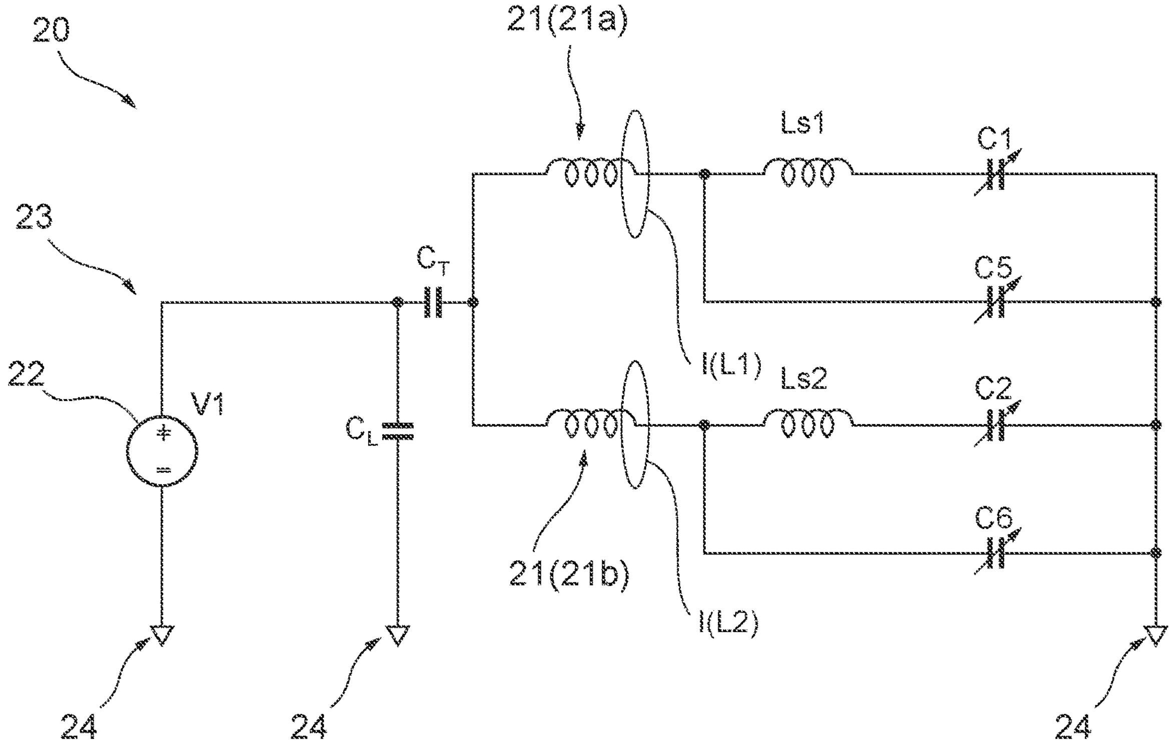
FIG. 11 is a diagram illustrating the one with capacitors with predetermined impedance in parallel on the same side as that of the adjusting coil when seen from the antenna coil as a variation of the high-frequency circuit of the plasma generating device shown in FIG. 10.

The plasma generating device 10 of this embodiment includes the antenna coils 21*a*, 21*b*, divided into two parts, as the antenna coils 21 (see FIG. 11). The inductances of the antenna coils 21*a*, 21 are L1, L2, respectively.

These antenna coils 21*a*, 21*b* are provided on the plural paths 23*a*, 23*b*, respectively, and are disposed in parallel (see FIG. 11). There is one unit of the high-frequency power supply 22 as the other embodiments, and the high-frequency power in the same frequency band is supplied (applied) to the antenna coils 21*a* to 21*d* provided on each of the paths 23*a*, 23*b* from the high-frequency power supply 22.

On each of the plural paths 23*a*, 23*b* of this embodiment, the adjusting coils Ls1, Ls2 are provided at positions opposite to the high-frequency power supply 22 when seen from the antenna coils 21*a*, 21*b*. Moreover, on each of the plural paths 23*a*, 23*b*, the capacitors C1, C2 for current distribution are provided on a side opposite to the antenna coils 21*a*, 21*b* when seen from the aforementioned adjusting coils Ls1, Ls2. Here, the adjusting coils Ls1, Ls2 may have predetermined inductance, or the inductance may be variable. Moreover, the capacitors C1, C2 for current distribution may also have the predetermined impedance, or the impedance may be variable.

Moreover, on each of the plural paths 23*a*, 23*b* of this embodiment, on the same side as the adjusting coils Ls1, Ls2 and the capacitors C1, C2 for current distribution when seen from the antenna coils 21*a*, 21*b*, second capacitors C5, C6 for current distribution having the predetermined impedance are disposed in parallel. Particularly, the second capacitors C5, C6 for current distribution are preferably capacitors with variable impedance. As described above, when a plurality of the antenna coils 21 are provided, adjustment of an amount (distributed amount) of the high-frequency current flowing in each of the plurality of paths 23*a*, 23*b* is needed in some cases. By providing the second capacitors C5, C6 for current distribution, as compared with the case where only the adjusting coils Ls1, Ls2 and the capacitors C1, C2 for current distribution are provided, adjustment responsiveness of the amount of the high-frequency current flowing in the plural paths 23*a*, 23*b* can be improved, which is preferable.

Figure 10:
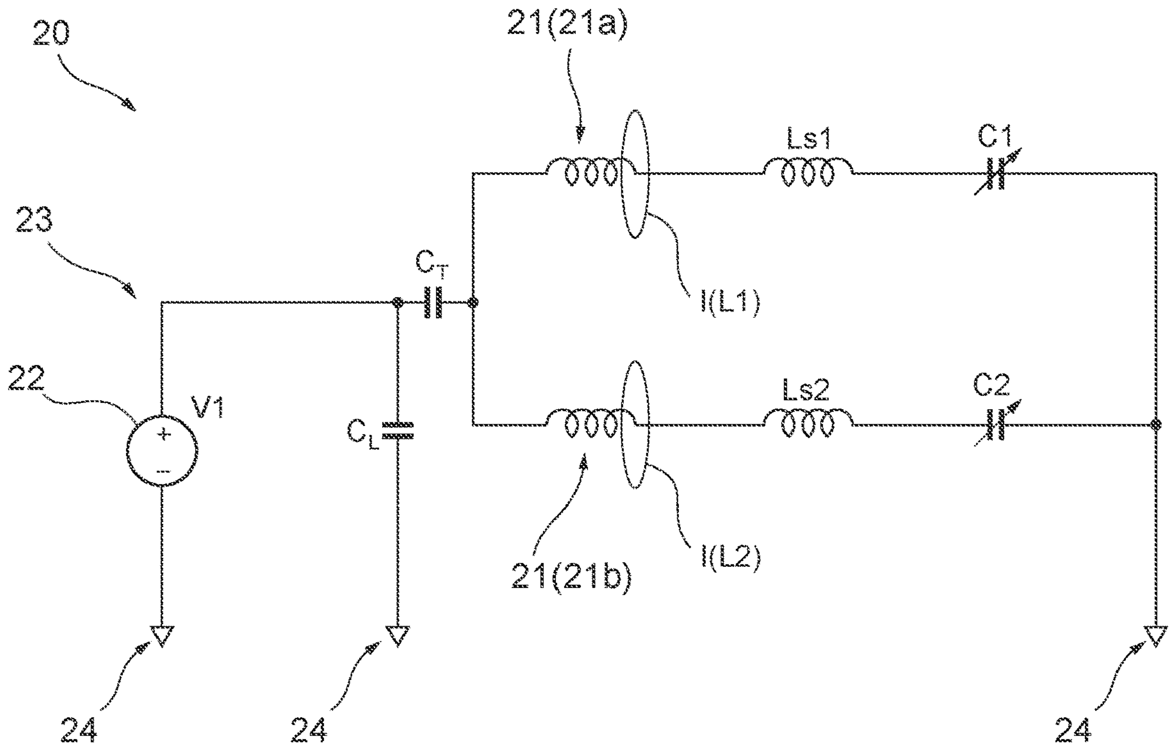
FIG. 10 is a diagram illustrating that the number of divisions of the antenna coil is simplified from 4 to 2 as a variation of the high-frequency circuit of the plasma generating device shown in FIG. 7.
Figure 12B:
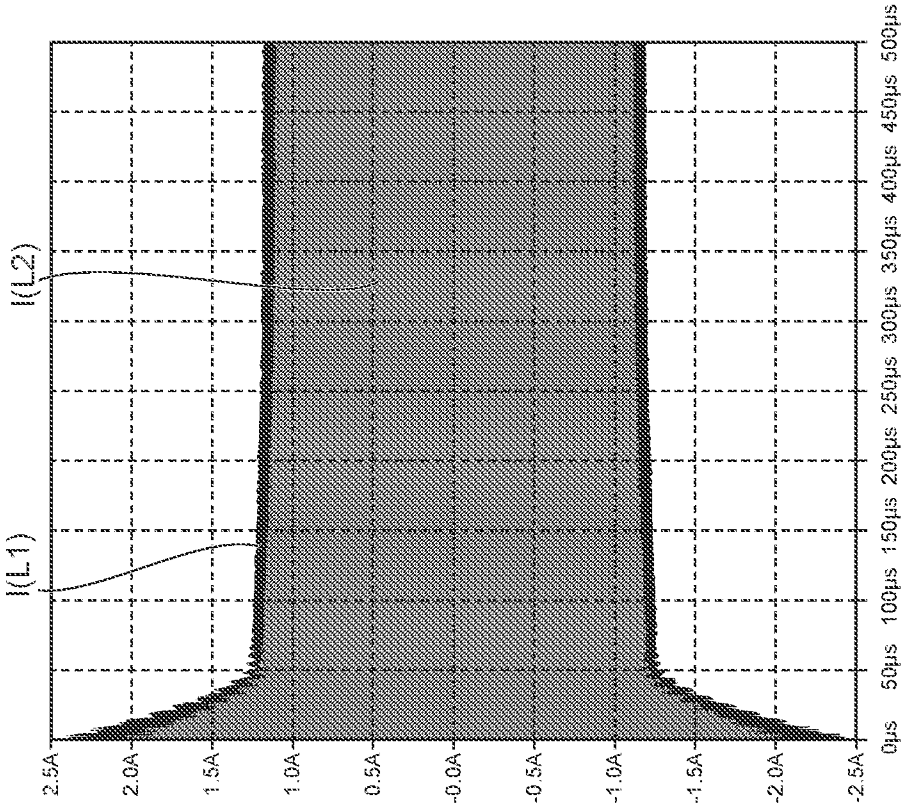
FIG. 12B is a graph illustrating a state of a change over time of the high-frequency currents I(L1), I(L2) when only the impedance of the capacitor C2 is changed from the condition in the aforementioned FIG. 12A.
Figure 12A:
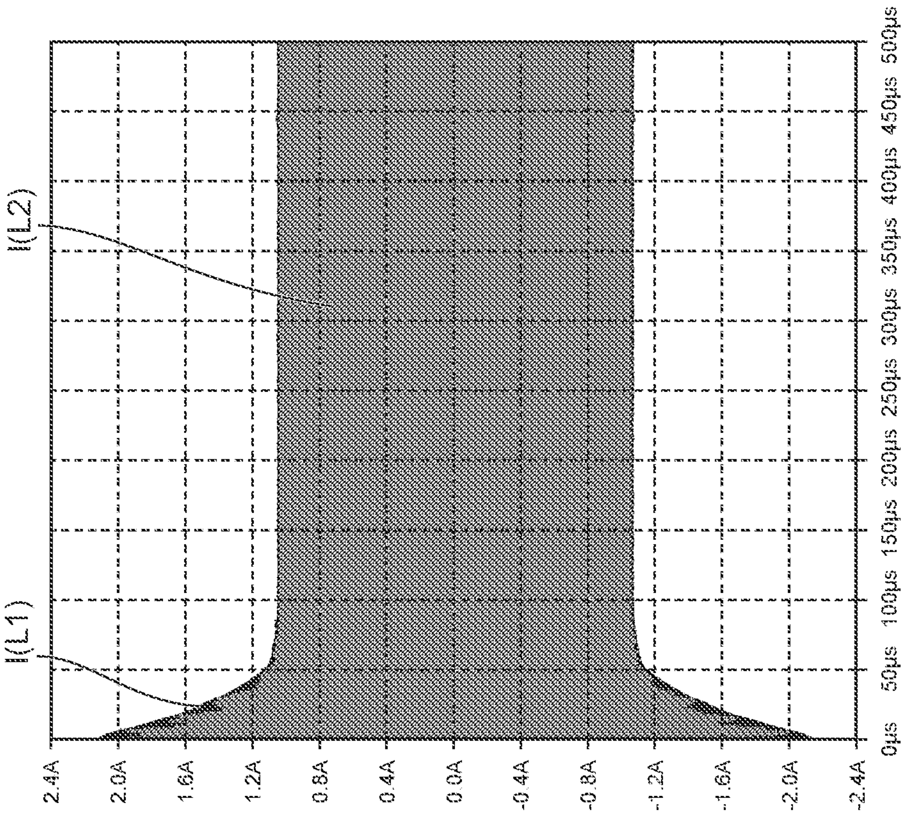
FIG. 12A is a graph illustrating a state of a change over time of high-frequency currents I(L1), I(L2) flowing in each of paths (23*a*, 23*b*), when inductances of the antenna coils L1, L2 are equal, the inductances of the adjusting coils Ls1, Ls2 are equal, and the impedances of capacitors C1, C2 for current distribution are equal in the high-frequency circuit shown in FIG. 10.

As a variation of the high-frequency circuit 20 of the plasma generating device 10 shown in FIG. 7, a circuit diagram in which the number of divisions of the antenna coil 21 is simplified from 4 to 2 is shown in FIG. 10. In the high-frequency circuit 20 shown in FIG. 10, when the inductances of the antenna coils L1, L2 are equal, the inductances of the adjusting coils Ls1, Ls2 are equal, and the impedances of the capacitors C1, C2 for current distribution are equal, states of changes over time of the high-frequency currents I(L1), I(L2) flowing in each of the paths 23*a*, 23*b* are shown in FIG. 12A. Moreover, states of changes over time of the high-frequency currents I(L1), I(L2) when only the impedance of the capacitor C2 is changed from the aforementioned condition is shown in FIG. 12B.

Figure 13B:
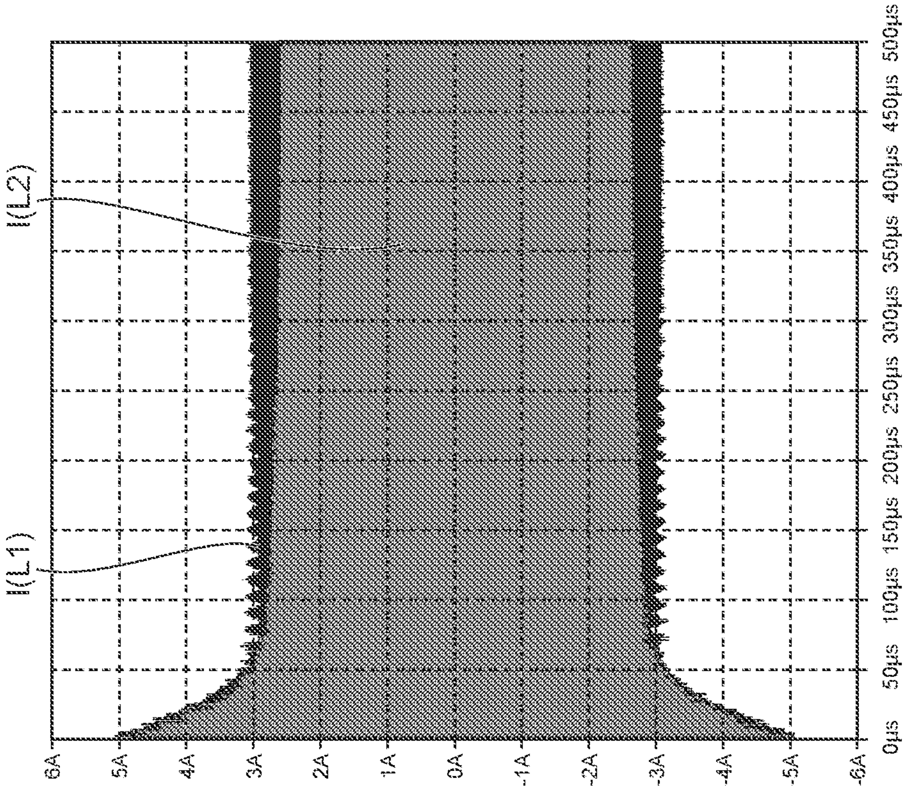
FIG. 13B is a graph illustrating a state of a change over time of the high-frequency currents I(L1), I(L2) when only the impedance of the capacitor C2 is changed from the condition in the aforementioned FIG. 13A.
Figure 13A:
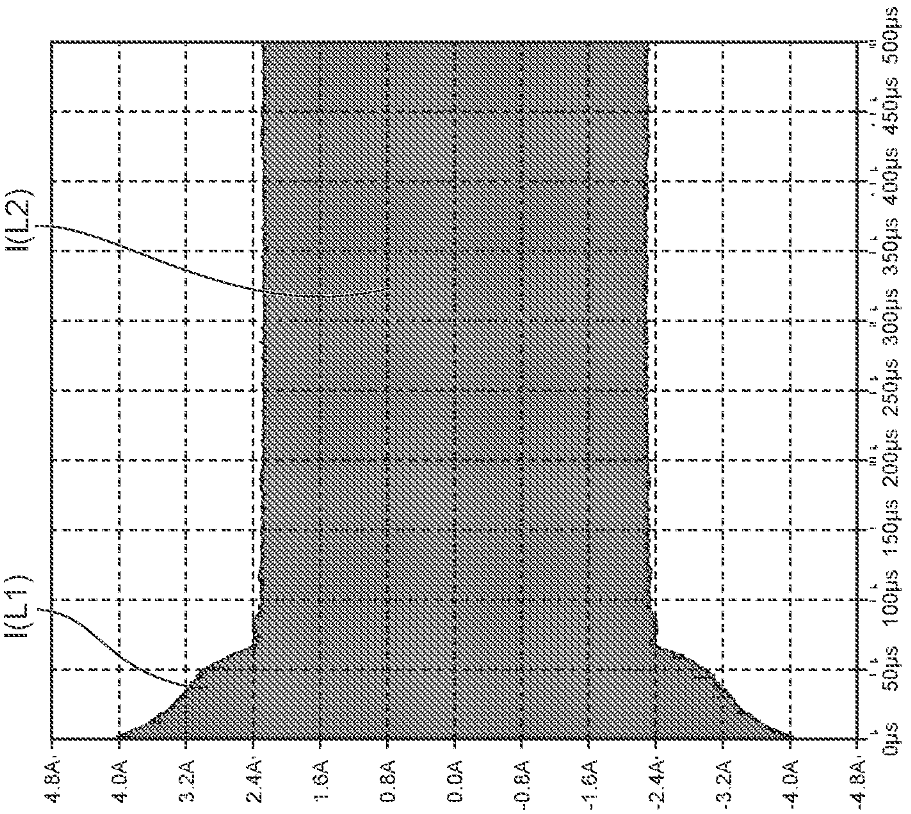
FIG. 13A is a graph illustrating a state of a change over time of the high-frequency currents I(L1), I(L2) flowing in each of the paths (23*a*, 23*b*), when inductances of the antenna coils L1, L2 are equal, the inductances of the adjusting coils Ls1, Ls2 are equal, the impedances of the capacitors C1, C2 for current distribution are equal, and the impedances of second capacitors C3, C4 for current distribution are equal in the high-frequency circuit shown in FIG. 11.

On the other hand, in the configuration in FIG. 11, when the second capacitors C5, C6 for current distribution are provided, the inductances of the antenna coils L1, L2 are equal, the inductances of the adjusting coils Ls1, Ls2 are equal, the impedances of the capacitors C1, C2 for current distribution are equal, and the impedances of the second capacitors C3, C4 for current distribution are equal, the state of the changes over time of the high-frequency currents I(L1), I(L2) flowing in each of the paths 23*a*, 23*b* is shown in FIG. 13A. Moreover, the state of the changes over time of the high-frequency currents I(L1), I(L2) when only the impedance of the capacitor C2 is changed from the aforementioned condition is shown in FIG. 13B.

From the above, it is known that the adjustment responsiveness can be improved by disposing the second capacitors C5, C6 for current distribution in parallel with the adjusting coils Ls1, Ls2 on a rear stage of the antenna coils 21*a*, 21*b* or the capacitors C1, C2 for current distribution. By the way, a capacitor with variable impedance may be used as at least one of the plurality of capacitors C5, C6 disposed in parallel as described above.

Fifth Embodiment

A fifth embodiment, which is an example of the plasma generating device 10 when used as a plasma processing device will be explained (see FIG. 15).

Figure 15:
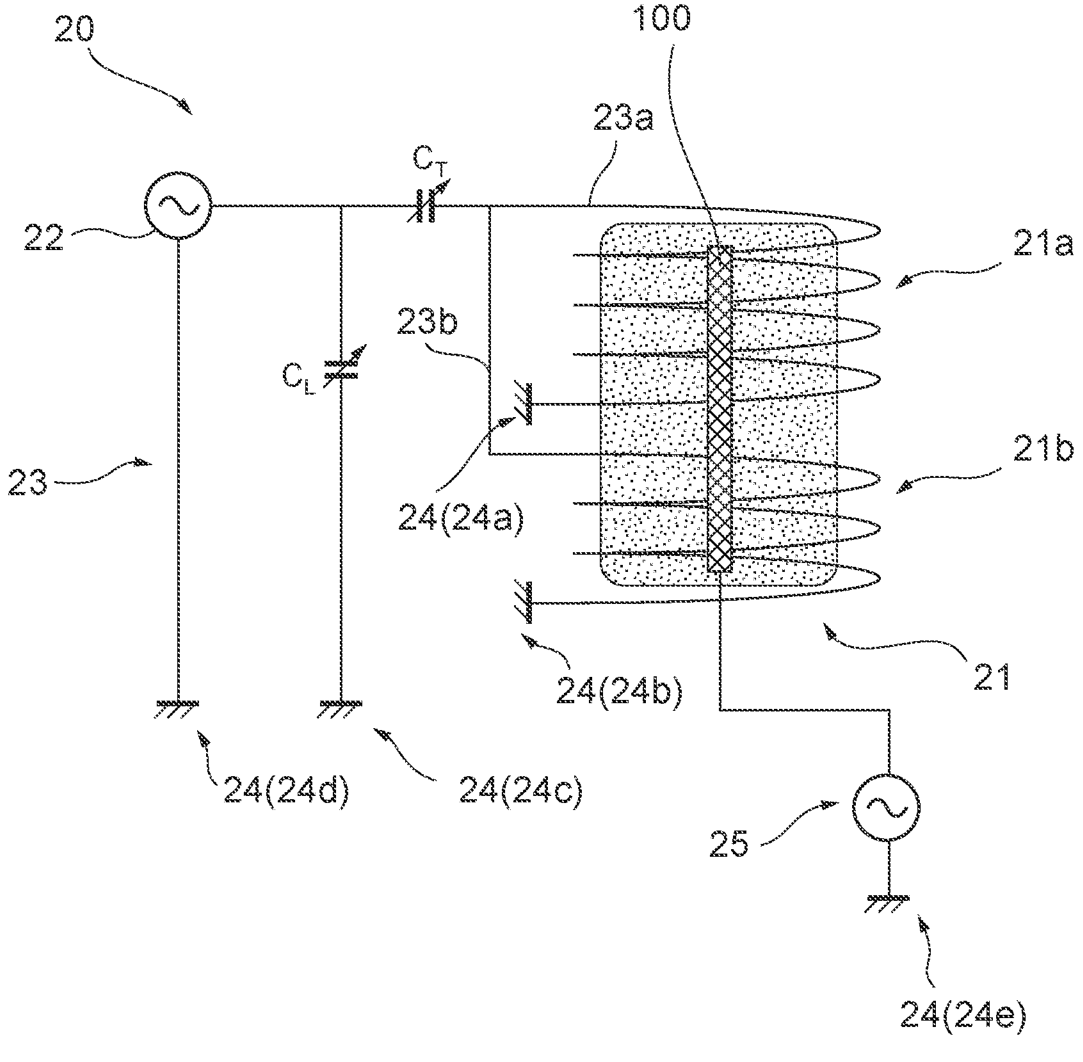
FIG. 15 is a diagram illustrating another example of the high-frequency circuit (example in which the high-frequency power supply is connected to the processing target) in the plasma generating device according to this disclosure.

The plasma processing device using the plasma generating device 10 shown in FIG. 4 is shown in FIG. 15. In the plasma processing device in FIG. 15, a high-frequency (13.56 MHZ, for example) circuit 20 for generating plasma is connected to the antenna coil 21. Moreover, to the roll mold 100, which is a processing target accommodated in the reaction container, not shown, a high-frequency (a frequency lower than the frequency for plasma generation, for example) circuit 25 for bias for taking in ions in the plasma is connected in addition to the grounding electrode 24 (24*e*). By connecting the high-frequency circuit 25 to the mold 100, a potential on the surface of the mold 100 can be adjusted, and an acceleration potential of the plasma generated by the antenna coil (21*a*, 21*b*) can be adjusted. By means of this configuration, adjustment of a surface processing speed of the processing target or a processing shape can be made by the plasma processing device. Moreover, as a circuit for bias, a DC circuit may be connected.

Figure 14:
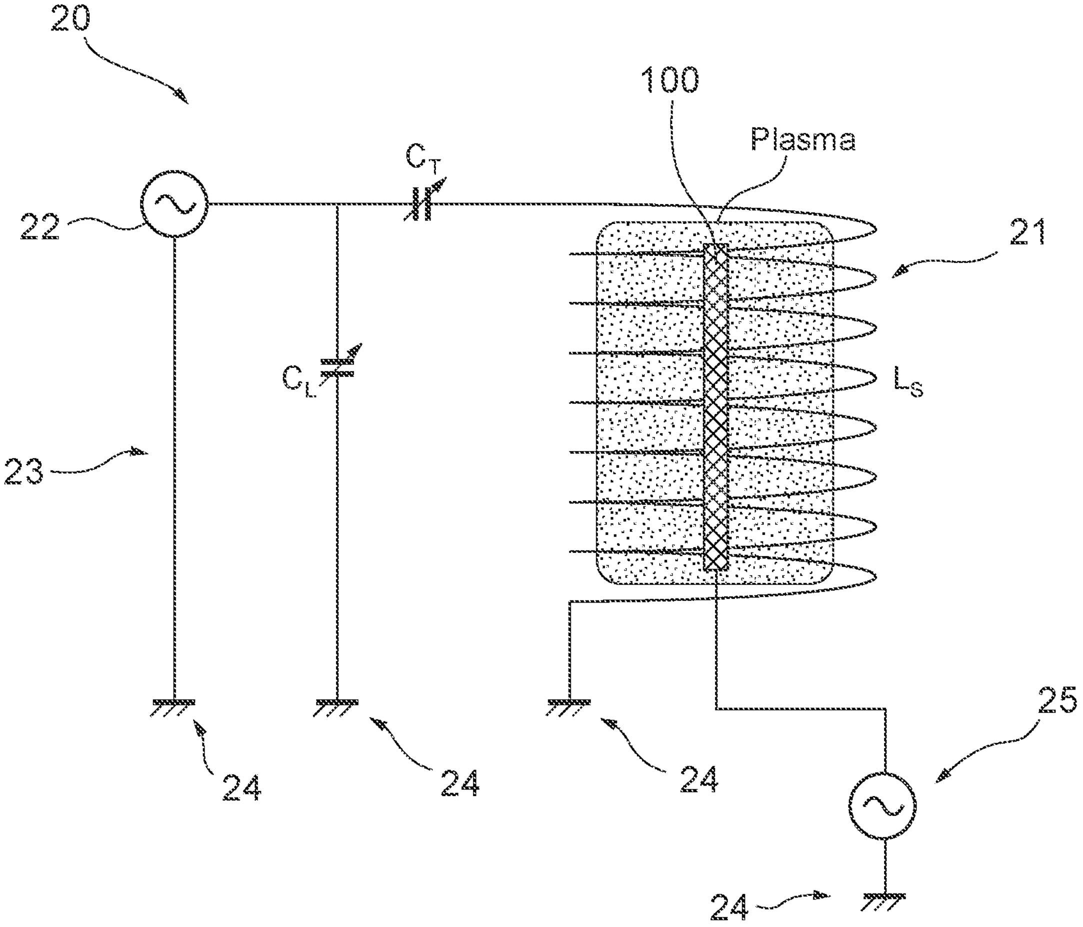
FIG. 14 is a diagram illustrating another example of the high-frequency circuit (example in which a high-frequency power supply is connected to the processing target) in the conventional plasma generating device as a reference.

FIG. 14 is a plasma processing device using the plasma generating device (FIG. 3) by the prior art, in which the antenna coil is not divided, and similarly to FIG. 15, the grounding electrode 24 and the high-frequency power supply 25 are connected to the mold 100 of a roll-shaped base material, which is the processing target, accommodated in the reaction container, not shown.

In this case, too, in the plasma processing device (FIG. 14) using the device (FIG. 3) in which the antenna coil is not divided as described above, the inductance L is increased, and it becomes difficult to employ the capacitor with the electrostatic capacitance C satisfying Formula 1. Thus, the size of the mold 100, which is the processing target and can be processed, is restricted, and processing of the mold 100 with a large area is difficult.

Note that the aforementioned embodiment is an example of a preferred embodiment of this disclosure, but this is not limiting and is capable of various variations within a range not departing from the gist of this disclosure. For example, the configurations in which the antenna coil is divided into two parts or four parts are exemplified in the aforementioned embodiments, but on the basis of the similar idea, it is needless to say that the number of divisions does not matter as long as the antenna coil 21 is divided into at least two or more parts.

A part or the whole of the aforementioned embodiments can be described as in the following additional remarks. However, the present invention is not limited to the following additional remarks.

[Additional Remark 1]

A plasma generating device including:

a high-frequency circuit having an inductive load and a high-frequency power supply which supplies high-frequency power to the inductive load; and a reaction container which is configured capable of pressure reduction and in which plasma is generated by applying the high-frequency power to the inductive load, in which the inductive load is constituted by a spiral antenna coil disposed so as to surround a periphery of the reaction container;

the antenna coil is divided into at least two or more parts; and the high-frequency circuit has a plurality of paths on which each of the antenna coils divided into at least two or more parts is provided.

[Additional Remark 2]

The plasma generating device described in the Additional Remark 1, characterized in that the reaction container has a cylindrical shape having the same axis as that of the antenna coil, and an inner diameter of the reaction container is smaller than the antenna coil diameter, and the antenna coil is disposed outside the reaction container.

[Additional Remark 3]

The plasma generating device described in the Additional Remark 1 or 2, characterized in that the reaction container includes a plurality of gas introduction portions which introduce a reaction gas into the reaction container from different positions.

[Additional Remark 4]

The plasma generating device described in the Additional Remark 1 or 2, characterized in that each of the plurality of paths is connected in parallel to the high-frequency power supply, and the high-frequency circuit is configured such that the high-frequency power supply supplies high-frequency power in the same frequency band to the plurality of paths.

[Additional Remark 5]

The plasma generating device described in the Additional Remark 1 or 2, in which the high-frequency circuit includes a grounding electrode to which sides of the plurality of paths opposite to the high-frequency power supply are connected in common.

[Additional Remark 6]

The plasma generating device described in any one of the Additional Remarks 1 to 3, in which any one of the plurality of paths has an adjusting coil on a side opposite to the high-frequency power supply with respect to the antenna coil.

[Additional Remark 7]

The plasma generating device described in the Additional Remark 6, in which the adjusting coil is a coil with variable inductance.

[Additional Remark 8]

The plasma generating device described in the Additional Remark 6 or 7, in which, each of the plurality of paths has a capacitor having predetermined impedance on a side opposite to the antenna coil with respect to the adjusting coil.

[Additional Remark 9]

The plasma generating device described in the Additional Remark 8, in which at least one of the plurality of capacitors is a capacitor with variable impedance.

[Additional Remark 10]

The plasma generating device described in the Additional Remark 7, in which each of the plurality of paths has a plurality of capacitors with predetermined impedance which are disposed in parallel on the same side as that of the adjusting coil when seen from the antenna coil.

[Additional Remark 11]

The plasma generating device described in the Additional Remark 10, in which at least one of the plurality of capacitors is a capacitor with variable impedance.

[Additional Remark 12]

The plasma generating device described in any one of the Additional Remarks 1 or 11, in which each of the antenna coils has a winding number larger than one winding.

[Additional Remark 13]

The plasma generating device described in any one of the Additional Remarks 1 to 8, including a control device which has a processor and a memory in which software for executing predetermined processing is stored and controls the high-frequency circuit, in which the high-frequency circuit has:

a first capacitor with variable impedance provided between the high-frequency power supply and the plurality of paths; and a second capacitor with variable impedance, branching from between the high-frequency power supply and the first capacitor and having the other end provided on the path connected to the grounding electrode, in which the memory stores a program for adjusting capacitances of the first capacitor and the second capacitor;

the memory further stores a reference data table including an output of the high-frequency power supply and an initial value and a target value of capacitance of each of the first capacitor and the second capacitor corresponding to the output; and the control device adjusts the capacitances of the first capacitor and the second capacitor on the basis of the program and the reference data table.

[Additional Remark 14]

The plasma generating device described in the Additional Remark 13, in which the memory further stores information relating to a variation degree when the capacitances of the first capacitor and the second capacitor are adjusted; and the controller further adjusts the capacitances of the first capacitor and the second capacitor on the basis of the variation degree.

[Additional Remark 15]

A plasma processing device including a high-frequency circuit having an inductive load and a high-frequency power supply which supplies high-frequency power to the inductive load and a reaction container which is configured capable of pressure reduction and in which plasma is generated by applying the high-frequency power to the inductive load, in which the inductive load is constituted by a spiral antenna coil disposed so as to surround a periphery of the reaction container;

the antenna coil is divided into at least two or more parts;

the reaction container includes a processing-target accommodating portion for accommodating a processing target; and the processing-target accommodating portion is disposed inside a space surrounded by the antenna coil.

[Additional Remark 16]

The plasma processing device described in the Additional Remark 15, in which the reaction container further includes a plurality of gas introduction portions which introduce a reaction gas into the reaction container from different positions.

[Additional Remark 17]

A plasma etching device for seamless roller mold, including a high-frequency circuit having an inductive load and a high-frequency power supply which supplies high-frequency power to the inductive load and a reaction container configured capable of pressure reduction and in which plasma is generated by applying the high-frequency power to the inductive load, in which the inductive load is constituted by a spiral antenna coil disposed so as to surround a periphery of the reaction container;

the antenna coil is divided into at least two or more parts;

the reaction container includes a processing-target accommodating portion for accommodating a processing target; and the processing-target accommodating portion is disposed inside a space surrounded by the antenna coil.

[Additional Remark 18]

The plasma etching device for seamless roller mold described in the Additional Remark 17, in which the reaction container further includes a plurality of gas introduction portions which introduce a reaction gas into the reaction container from different positions.

INDUSTRIAL APPLICABILITY

The plasma device according to this disclosure is preferably applied to ICP type dry etching or the like.

REFERENCE SIGNS LIST

10 Plasma generating device (plasma processing device, plasma etching device for seamless roller mold)
20 High-frequency circuit
21 Antenna coil (inductive load)
22 High-frequency power supply
23 Path
24 Grounding electrode
25 High-frequency circuit
30 Reaction container
31 Mold accommodating portion (processing-target accommodating portion)
32 Gas flow path
34 Gas introduction hole
35 Gas introduction portion
36 Gas introduction tube
37 Discharge tube
40 Control device
41 Processor
42 Memory
50 Actuator
100 Mold (processing target)
A Center axis (axis) of reaction container and/or antenna coil
C (C1 to C4) Capacitor for current distribution
$C_T$ Variable capacitor (first capacitor)
$C_L$ Variable capacitor (second capacitor)
DT Reference data table
Ls (Ls1, Ls2, Ls3, Ls4) Adjusting Coil

What is claimed is:

1. A plasma processing device comprising a high-frequency circuit having an inductive load and a high-frequency power supply which supplies high-frequency power to the inductive load and a reaction container which is configured capable of pressure reduction and in which plasma is generated by applying the high-frequency power to the inductive load, wherein the reaction container has a processing-target accommodating portion for accommodating a processing target, the processing-target accommodating portion located inside the reaction container, the inductive load is constituted by a spiral antenna coil disposed to surround a periphery of the reaction container, so that the processing target in the processing-target accommodating portion is entirely surrounded by the spiral antenna coil, and the antenna coil is divided into at least two or more parts.

2. The plasma processing device according to claim 1, wherein the reaction container further includes a plurality of gas introduction portions which introduce a reaction gas into the reaction container from different positions.

3. A plasma etching device for seamless roller mold, comprising:

a high-frequency circuit having an inductive load and a high-frequency power supply which supplies high-frequency power to the inductive load and a reaction container configured capable of pressure reduction and in which plasma is generated by applying the high-frequency power to the inductive load, wherein the reaction container has a processing-target accommodating portion for accommodating a processing target, the processing-target accommodating portion located inside the reaction container, the inductive load is constituted by a spiral antenna coil disposed to surround a periphery of the reaction container, so that the processing target in the processing-target accommodating portion is entirely surrounded by the spiral antenna coil, and the antenna coil is divided into at least two or more parts.

4. The plasma etching device for seamless roller mold according to claim 3, wherein the reaction container further includes a plurality of gas introduction portions which introduce a reaction gas into the reaction container from different positions.

* * * * *